(12) United States Patent
Ould-Brahim (10) Patent No.: US 9,124,486 B2
(45) Date of Patent: Sep. 1, 2015

(54) METHOD FOR ESTABLISHING MULTI SEGMENT PSEUDOWIRE ACROSS DOMAINS HAVING DIFFERENT PSEUDOWIRE SIGNALING PROTOCOL

(75) Inventor: Hamid Ould-Brahim, Kanata (CA)

(73) Assignee: RPX Clearinghouse, LLC, San Francisco, CA (US)

( * ) Notice: Subject to any disclaimer, the term of this patent is extended or adjusted under 35 U.S.C. 154(b) by 2057 days.

(21) Appl. No.: 12/064,477

(22) PCT Filed: Aug. 25, 2006

(86) PCT No.: PCT/CA2006/001407
§ 371 (c)(1),
(2), (4) Date: Feb. 22, 2008

(87) PCT Pub. No.: WO2007/022640
PCT Pub. Date: Mar. 1, 2007

(65) Prior Publication Data
US 2008/0253367 A1  Oct. 16, 2008

Related U.S. Application Data (60) Provisional application No. 60/711,861, filed on Aug. 26, 2005.

(51) Int. Cl.
*H04L 12/28* (2006.01)
*H04L 12/54* (2013.01)
(Continued)

(52) U.S. Cl.
CPC ............... *H04L 45/04* (2013.01); *H04L 45/50* (2013.01); *H04L 45/507* (2013.01); *H04L 45/68* (2013.01); *H04L 69/08* (2013.01); *H04Q 2213/13176* (2013.01); *H04Q 2213/13204* (2013.01)

(58) Field of Classification Search
CPC .............. H04L 12/283; H04L 12/2836; H04L 12/4645; H04L 12/4666; H04L 12/54; H04L 2012/563; H04L 2012/6486; H04L 29/06; H04L 29/06068; H04L 29/06095; H04L 29/0619; H04L 29/12056; H04L 29/12066; H04L 45/04; H04L 45/50; H04L 45/507; H04L 45/68; H04L 61/10; H04L 61/106; H04L 65/10; H04L 65/1003; H04L 69/08; H04Q 2213/13176; H04Q 2213/13204
USPC ................. 370/389, 392, 400, 410, 428, 467; 709/201, 230
See application file for complete search history.

(56) References Cited

U.S. PATENT DOCUMENTS 6,985,488 B2 *  1/2006  Pan et al. ................... 370/395.3
7,082,140 B1 *  7/2006  Hass ............................ 370/466
(Continued)

OTHER PUBLICATIONS

Luca Martini (Ed) Cisco Systems et al: Pseudowire Setup and Maintenance using LDP; draft-ietf-pwe3-control-protocol-14.txt, IETF Standard-Working-Draft, Internet Engineerign Task Force, IETF, CH, vol. pwe3, No. 14, Dec. 1, 2004, XP015025980, ISSN: 0000-0004, 40 pages.
(Continued)

*Primary Examiner* — Alpus H Hsu
(74) *Attorney, Agent, or Firm* — Withrow & Terranova, PLLC (57) ABSTRACT

A method of establishing a multi-segment pseudowire (MS-PW) across domains executing different pseudowire signaling protocols augments a Label Distribution Protocol (LDP) label message to include a MS-PW Type-Length-Value (TLV). The MS-PW TLV carries pseudowire signal protocol information associated with signaling protocols of other segments of the MS-PW. As a result, a multi-segment pseudowire can be extended between domains that execute different pseudowire signaling protocols.

24 Claims, 8 Drawing Sheets (51) Int. Cl.
*G06F 15/16* (2006.01)
*H04L 12/715* (2013.01)
*H04L 12/723* (2013.01)
*H04L 12/721* (2013.01)
*H04L 29/06* (2006.01)

(56) References Cited

U.S. PATENT DOCUMENTS

| | | | |
|---|---|---|---|
| 7,463,639 B1 * | 12/2008 | Rekhter | 370/409 |
| 7,483,387 B2 * | 1/2009 | Guichard et al. | 370/252 |
| 7,593,398 B2 * | 9/2009 | Booth et al. | 370/389 |
| 7,630,298 B2 * | 12/2009 | Shand et al. | 370/218 |
| 7,940,652 B1 * | 5/2011 | Pan | 370/228 |
| 7,974,223 B2 * | 7/2011 | Zelig et al. | 370/258 |
| 8,289,964 B2 * | 10/2012 | Ould-Brahim et al. | 370/392 |
| 8,594,097 B2 * | 11/2013 | Ould-Brahim et al. | 370/392 |
| 8,693,323 B1 * | 4/2014 | McDysan | 370/230 |
| 2005/0068933 A1 * | 3/2005 | Kokkonen et al. | 370/349 |
| 2006/0062248 A1 * | 3/2006 | Huang et al. | 370/466 |
| 2006/0146832 A1 * | 7/2006 | Rampal et al. | 370/395.5 |
| 2007/0011352 A1 * | 1/2007 | Martini et al. | 709/239 |
| 2007/0030851 A1 * | 2/2007 | Sinicrope et al. | 370/392 |

OTHER PUBLICATIONS

Florin Balus Mike Loomis Jeff Sugimoto Nortel Networks: "Multi-hop Pseudowire Setup and Maintenance using LDP; draft-balus-mh-pw-control-protocol-00.txt" IETF Standard-Working-Draft, Internet Engineering Task Force, IETF, CH, Feb. 1, 2005, XP015037603, ISSN: 0000-0004, 16 pages.

European Search Report with European Search Opinion from corresponding PCT application PCT/CA2006001407, Dec. 2, 2010, 5 pages.

* cited by examiner

METHOD FOR ESTABLISHING MULTI SEGMENT PSEUDOWIRE ACROSS DOMAINS HAVING DIFFERENT PSEUDOWIRE SIGNALING PROTOCOL

CROSS REFERENCE TO RELATED APPLICATIONS

This application claims priority under 35 U.S.C. §1.119(e) to provisional patent application No. 60/711,861 filed on Aug. 26, 2005 by Hamid Ould-Brahim, incorporated herein by reference.

FIELD OF THE INVENTION

This invention relates generally to the field of multi-segment pseudowire and more particularly to establishment and maintenance of multi-segment pseudowire networks.

BACKGROUND OF THE INVENTION

A Pseudowire (PW) is an emulation of a native service over a Packet Switched Network (PSN). The native service may be a layer 2 or Synchronous Optical Networking (SONET) connection, Asynchronous Transfer Mode (ATM), Frame Relay, Ethernet, low-rate Time-Division Multiplexing (TDM), or SONET/Synchronous Digital Hierarchy (SDH), while the PSN may be Multiprotocol Label Switching (MPLS), Internet Protocol (IP) (either IPv4 or IPv6), or Layer 2 Tunnel Protocol Version 3 (L2TPv3). More particularly, a pseudowire is a tunnel established between two provider-edge (PE) nodes to transport Layer 2 Protocol Data Units (PDUs) across a packet switched network (PSN).

A multi-segmented pseudowire (MS-PW) is one which traverses multiple PSN domains, i.e., one or more Service Provider (SP) networks, or multiple networks within the same SP network (e.g. an access and core network). More specifically a MS-PW is a static or dynamically configured set of two or more contiguous pseudowire segments that behave and function as a single point-to-point pseudowire. Each end of a MS-PW terminates at an Ultimate Provider Edge (U-PE) device.

Pseudowires may be established using a variety of processes including by static configuration (using MPLS or L2TPv3) or by Label Distribution Protocol (LDP). LDP defines two Forwarding Equivalency Class (FEC) elements which may be used to establish pseudowires; PWid FEC 128 and Generalized PWid FEC 129. As the standards for pseudowire signaling continues to evolve, deployed network devices may execute different LDP pseudowire signaling protocols. It is desirable to identify a method that enables MS-PW to extend between PSN domains that use different pseudowire signaling protocols.

SUMMARY OF THE INVENTION

According to one aspect of the invention, a method of establishing a multi-segment pseudowire (MS-PW) across two domains is provided, where the two domains are coupled by an edge device. The method includes the step of forwarding a label mapping message to the edge device using a first pseudowire signaling protocol, the label mapping message including an MS-PW element including fields associated with a second pseudowire signaling protocol.

According to another aspect of the invention, an edge device includes a label map for associating labels with pseudowires and logic, coupled to the label map, for generating a label mapping message including a Forwarding Equivalency Class (FEC) element for storing information related to a first pseudowire signaling protocol and a multi-segment pseudowire element for storing information related to a second pseudowire signaling protocol. The edge device also includes forwarding logic for forwarding the label mapping message to a coupled edge device.

According to a further aspect of the invention, a method of establishing a multi-segment pseudowire includes the steps of receiving an upstream label message from an upstream edge device using a first pseudowire signaling protocol, the upstream label message including a FEC element including information associated with the first pseudowire signaling protocol and a multi-segment pseudowire (MS-PW) element including information associated with a second pseudowire signaling protocol; determining that a downstream edge device uses the second pseudowire signaling protocol; modifying the upstream label message to provide a downstream label message, including the step of extracting information from the MS-PW element to include in a downstream FEC element of the downstream label; and forwarding the downstream label to the downstream edge device.

According to another aspect of the invention, a non-transitory computer readable medium storing a label map and instructions, the label map includes a label message comprising a label Type-Length-Value (TLV), a Forwarding Equivalency Class (FEC) TLV for storing information related to a first pseudowire signaling protocol and a multi-segment pseudowire (MS-PW) element for storing information related to a second pseudowire signaling protocol and the instructions comprising steps for forwarding the label message to a coupled edge device.

These and other advantages of the invention will be described in more detail with regard to the below figures.

DETAILED DESCRIPTION

Figure 1:
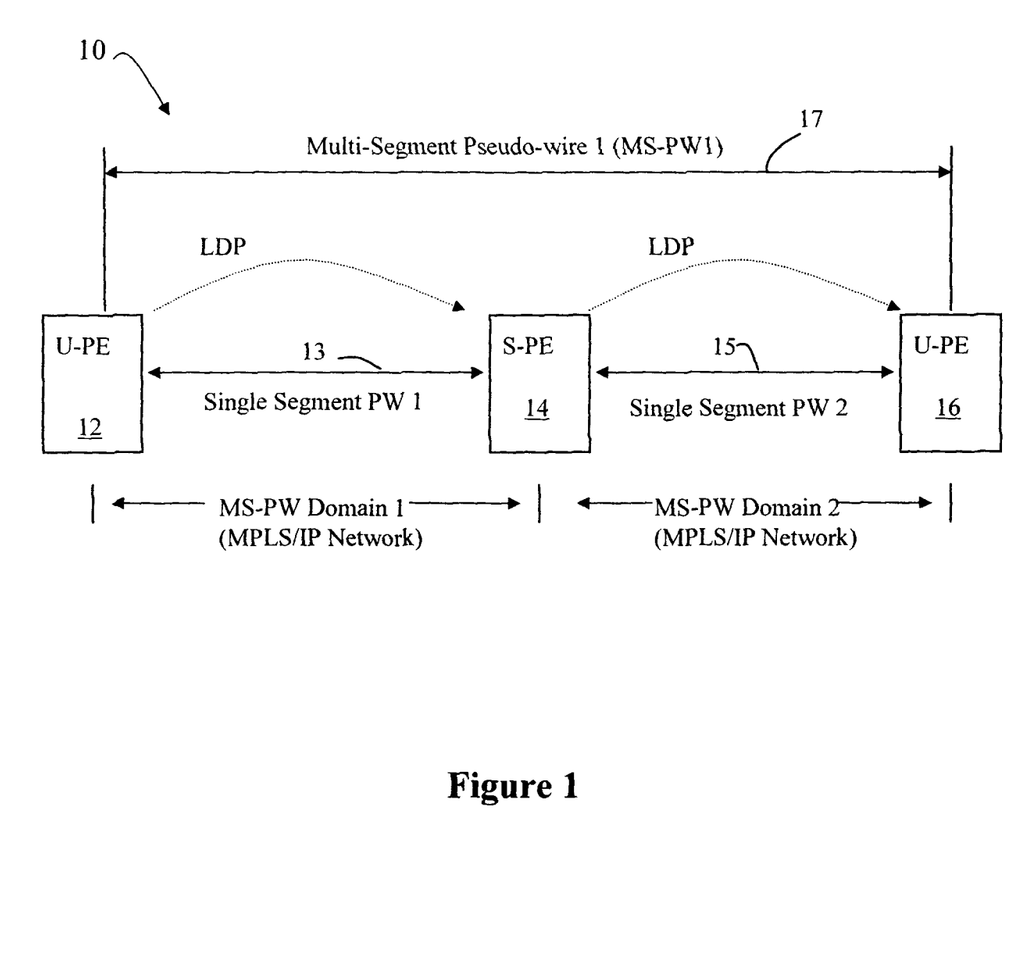
FIG. 1 is a diagram of a network that includes multiple Packet Switched Network (PSN) domains, and illustrates the extension of a Multi-Segment Pseudowire (MS-PW) across the domains.

Multi-Segmented Pseudowire (MS-PW) is a static or dynamically configured set of two or more contiguous Pseudowire (PW) segments that behave and function as a single point-to-point pseudowire. Thus each MS-PW may be viewed as a single pseudowire that for technical or administrative reasons is segmented into a number of concatenated hops. FIG. 1 illustrates a typical MS-PW 10.

Each end of a MS-PW terminates at an Ultimate Provider Edge (U-PE) device. In FIG. 1, MS-PW 17 terminates at U-PE's 12 and 16, and includes Single Segment Pseudowires 13 and 15. Using pseudo-Wire Emulation Edge-to-Edge (PWE3), a MS-PW may traverse any number of Switching Provider Edge (S-PE) devices, such as S-PE 14. From the perspective of U-PE, a MS-PW is indistinguishable from a Single Segment pseudowire (SS-PW).

The PEs of FIG. 1 may each reside in different Packet Switched Network (PSN) domains. A first PSN tunnel extends from U-PE 12 to S-PE 14 across PSN domain 1, and a second PSN tunnel extends from S-PE 14 to U-PE 16. The tunnels are connected at S-PE to complete the MS-PW 17.

A protocol for establishing and maintaining pseudowires (PW) using extensions to a Label Distribution Protocol (LDP) is described in Internet Engineering Task Force (IETF) Request for Comments (RFC) 4447, entitled Pseudowire Setup and Maintenance Using Label distribution Protocol (LDP), by Martini et al, April 2006, incorporated herein by reference.

IETF RFC 3036, incorporated herein by reference, defines the Label Distribution Protocol. LDP is a set of procedures and messages by which Label Switched Routers (LSRs) establish Label Switched Paths (LSPs) through a network by mapping network-layer routing information directly to data-link layer switched paths. LDP associates a Forwarding Equivalence Class (FEC) with each LSP it creates. The FEC associated with an LSP specifies which packets are "mapped" to that LSP.

Figure 2:
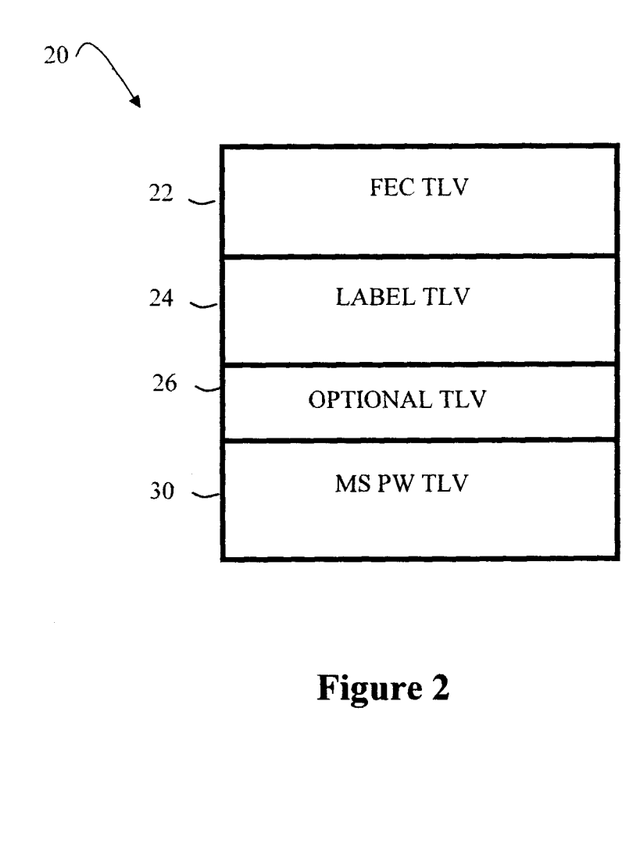
FIG. 2 is a diagram illustrating a modified Label Distribution Protocol (LDP) label message of the present invention, which includes an MS-PW Type-Length-Value (TLV) element.

LDP uses a Type-Length-Value (TLV) encoding scheme to encode much of the information carried in LDP messages. An LDP label mapping message 20 of the present invention is shown in FIG. 2. The label mapping message 20 includes a Label TLV 24, FEC TLV 22 and Optional TLVs 26. According to one aspect of the invention, the label mapping message also includes a MS-PW TLV 30.

The Label TLV 24 encodes a label. Label TLVs are carried by the messages used to advertise, request, release and withdraw label mappings. There are several different kinds of Label TLVs which can appear in situations that require a Label TLV.

The FEC TLV 22 is a list of one or more FEC elements associated with the label. RFC 4447 defines two FEC elements that are used for the emulation of end-to-end pseudowires; a PWid element (FEC element type 0x80, commonly referred to as FEC 128) and Generalized PWid element (FEC element type 0x81, commonly referred to as FEC 129). Each FEC element may have uniquely encoded fields. For example, FIGS. 3A and 3B, illustrate the encodings for FEC 128 and FEC 129 as described in RFC 4447, incorporated by reference above.

The MS-PW TLV of the present invention bridges the information gap between the FEC 128 and FEC 129 protocol in the following manner.

Figure 3A:
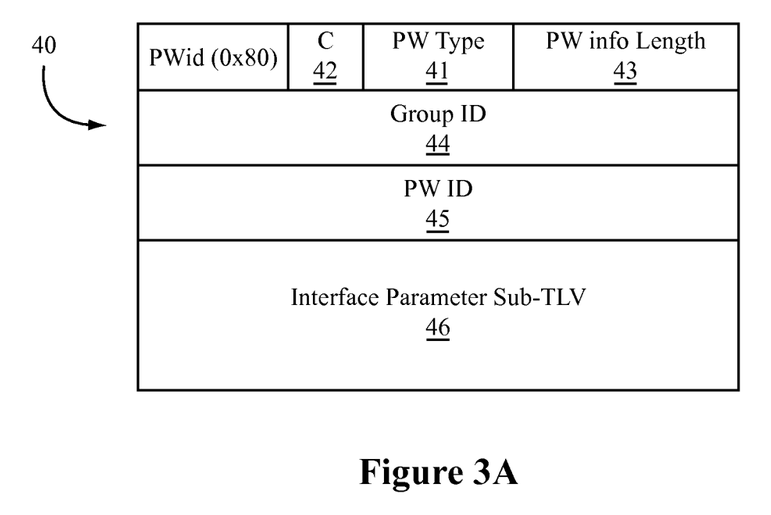
FIGS. 3A and 3B illustrate exemplary fields of a pseudowire identifier (PWid) element and a Generalized PWid element, used for pseudowire establishment using LDP.
Figure 3B:
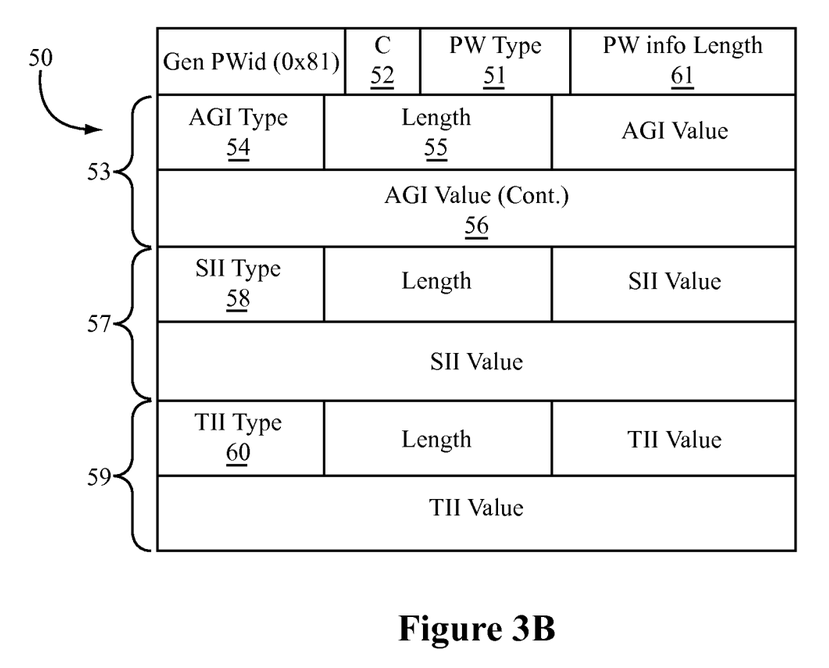

A pseudowire that is established using FEC 128 is provisioned at both endpoints; i.e., both end-points provision for the pseudowire, and the pseudowire is assigned a PWid such as that shown in FIG. 3A, which is referenced by both end-points when the pseudowire is used. The FEC 128 element of FIG. 3A illustrates exemplary fields that are included in an FEC 128 element 40. The pseudowire Type 41 contains a value that represents the type of pseudowire, as specified in "IANA Allocations for Pseudowire Edge to Edge Emulation (PWE3)", IETF RFC 4446, Martini et al, April 2006. Control word bit C 42 flags the presence of a control word. Pseudowire Information Length 43 specifies the length of the pseudowire identifier (ID) field and the interface parameters sub-TLV in octets. Group ID 44 is an arbitrary value that represents a group of pseudowires that is used to create groups in the pseudowire space. The group ID 44 is intended to be used as a port index, or a virtual tunnel index. The pseudowire ID 45 is a connection ID that, together with the pseudowire type, identifies a particular pseudowire. For FEC 128, the pseudowire ID and the pseudowire type must be the same for both endpoints.

Using the PWid FEC 128, each of the two endpoints independently initiates the setup of a uni-directional LSP. An outgoing LSP and incoming LSP are bound together in a single pseudowire if they have the same pseudowire ID and pseudowire type. Thus, FEC 128 uses double sided provisioning to establish a pseudowire.

Pseudowires that are established using FEC 129 elements are provisioned at a single end. Each pseudowire forwarding device is associated with an Attachment Interface, and pseudowires are referenced using AI information such as that shown in FIG. 3B. The single ended provisioning capabilities provided by FEC 129 facilitate the construction of MS-PW. FIG. 3B illustrates several fields that are included in an FEC 129 element. The FEC 129 element 50 includes a Control word bit 52, a pseudowire type 51 and a Pseudowire Information length field 61. However, rather than a Group ID or pseudowire ID, the FEC 129 element includes a Attachment Group Identifier (AGI) element 53, a Source Attachment Individual Identifier (SAII) element 57, and a Target Attachment Individual Identifier (TAII) element 59. In FEC 129, the association of two unidirectional LSPs into a single bidirectional pseudowire depends on the SAII and the TAII.

FEC 128 was the first standard proposed for pseudowire, and many edge devices implementing the FEC 128 protocol have been deployed in the network. The IETF pseudowire standards have evolved in the direction of FEC 129, which provides increased network flexibility and allows MS-PW to be more easily implemented. However the protocols as they currently exist do not enable a MS-PW to be established across domains that use different signaling protocols, because any system that implements FEC 128 would not have access to the Attachment Information of FEC 129, and any device that implements FEC 129 would not have readily available the pseudowire ID for supporting FEC 128 pseudowire.

Figure 4:
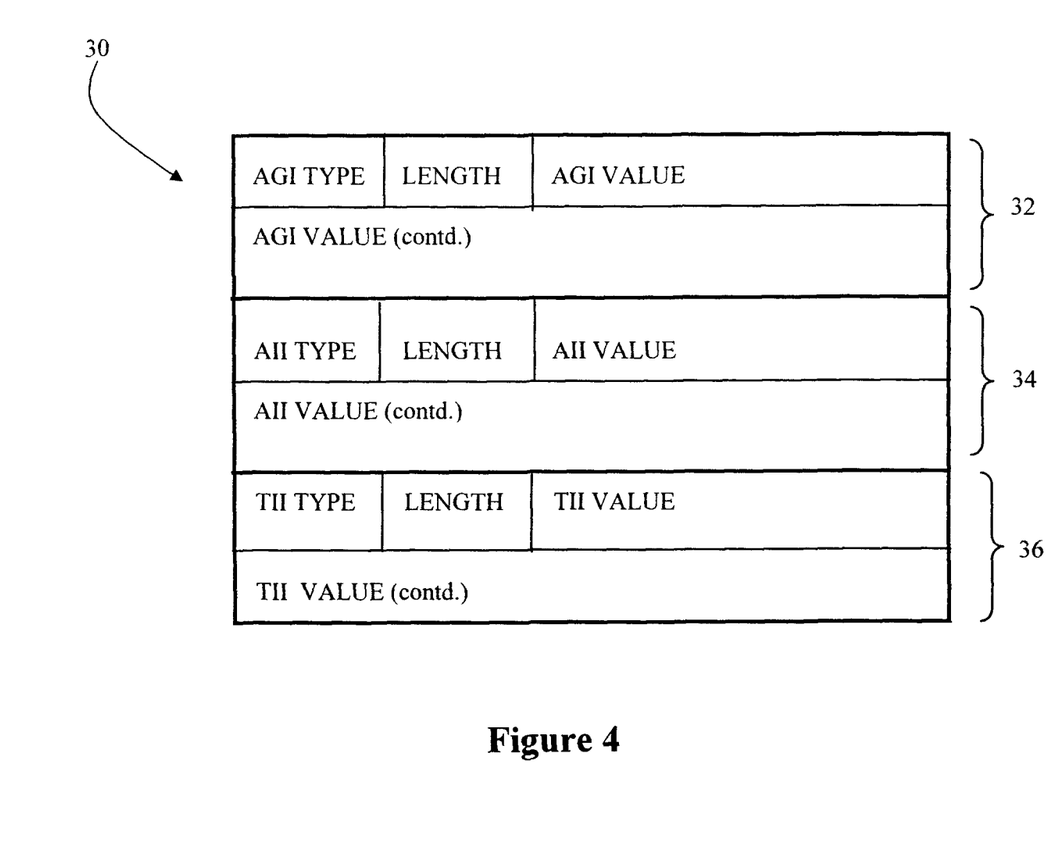
FIG. 4 is a diagram illustrating exemplary fields that may by included in a MS-PW TLV in a modified LDP label message such as that shown in FIG. 2.

Referring back again to FIG. 2, the present invention overcomes the problems of the prior art by augmented the LDP label message to include the Multi-Segment Pseudowire (MS-PW) TLV 30. The MS-PW TLV includes certain MS-PW information that allows a MS-PW to be formed of Single Segment pseudowires that are established using different signaling protocols. An example of several fields that may be included in a MS-PW TLV 30 of the present invention is shown in FIG. 4. The fields include an Attachment Group Identifier (AGI) 32, a Source Attachment Individual Identifier (SAII) 34 and a Target Attachment Individual Identifier (TAII) 36. Although three types of Attachment Identifiers (AIs) are shown in FIG. 4, the present invention is not limited to MS PW embodiments that include all or only these AI, but rather encompasses the inclusion of any pseudowire protocol information in a separate TLV to enable MS PW to extend across multiple PEs of different protocols. Thus, all three identifier values need not be present for the purposes of establishing MS-PW. For example, the AGI 32 is not required in all scenarios.

RFC 4447 generally defines attachment identifiers. Every forwarder in a provider edge device is associated with an Attachment Identifier (AI). A set of forwarders may be regarded as being members of a particular group and a pseudowire may be set up among members of the group. An Attachment Group Identifier (AGI) 32 identifies members of a group associated with a pseudowire. An Attachment Identifier may therefore include an Attachment Individual Identifier (AII) and an Attachment Group Identifier (AGI). From the perspective of a PE, each pseudowire has a local or "Source AII" (SAII) 34 and a remote or Target AII (TAII) 36. In one embodiment, the SAII, TAII and AGI are carried as octet strings. The Length field specifies the size of the Value field. The inclusion of this or similar information in an MS-PW TLV allows SS-PWs that are established using different signaling protocols (FEC 128, FEC 129, Layer 2 Tunnel Protocol, Resource Reservation Protocol for Traffic Engineering (RSPV-TE)) to be included in a MS-PW.

It should be noted that although the particular examples shown and described herein refer to the use of the MS-PW TLV to bridge the information gap between FEC 128 and FEC 129 protocols, the present invention is not restricted to use with these particular protocols. Rather the basic idea of forwarding bridge information between PSN domains operating different pseudowire signaling protocols to enable MS PW segments to extend through the different PSN domain may be used to forward data for any pseudowire signaling protocol, including but not limited to Layer 2 Tunneling Protocol (L2TP) information, RSVP-TE information, etc.

Figure 5:
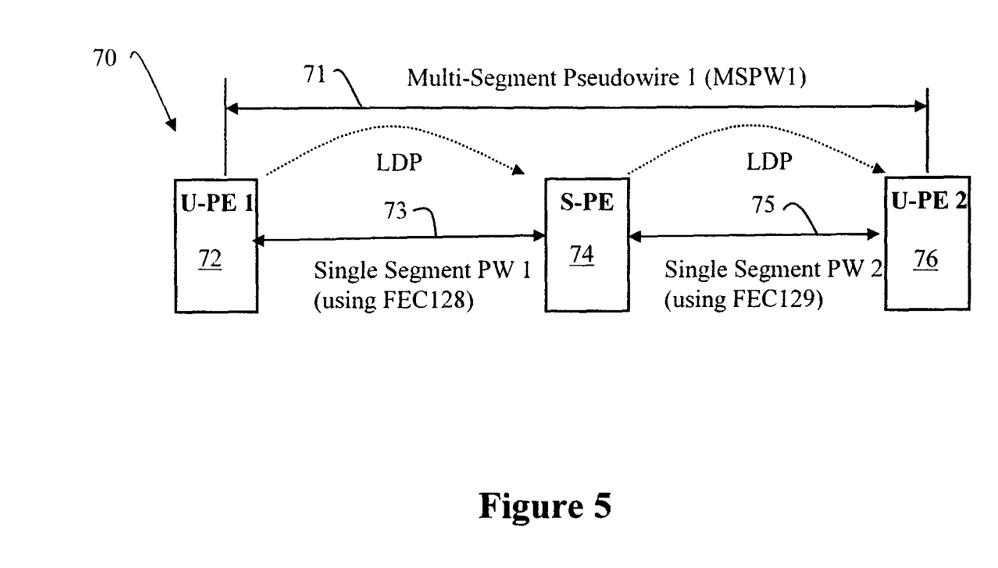
FIGS. 5-7 are functional flow diagrams which are used to describe a process for establishing a MS-PW across different pseudowire signaling domains.
Figure 6:
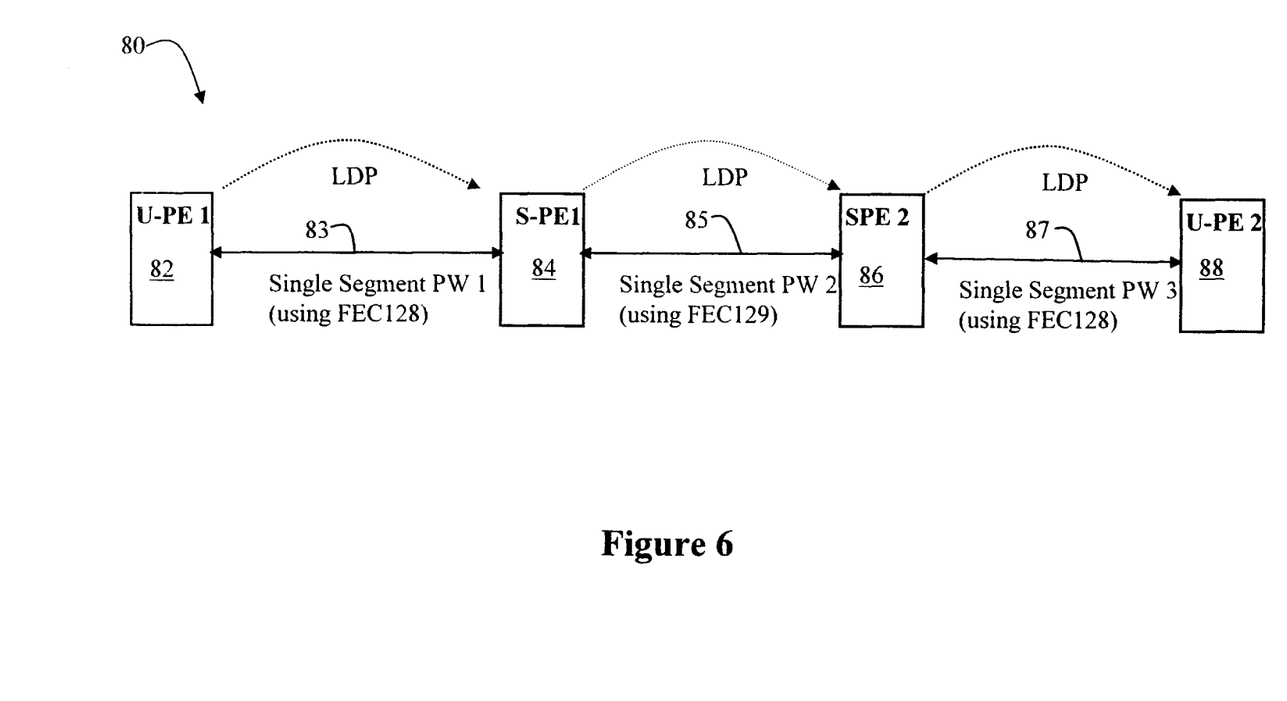
Figure 7:
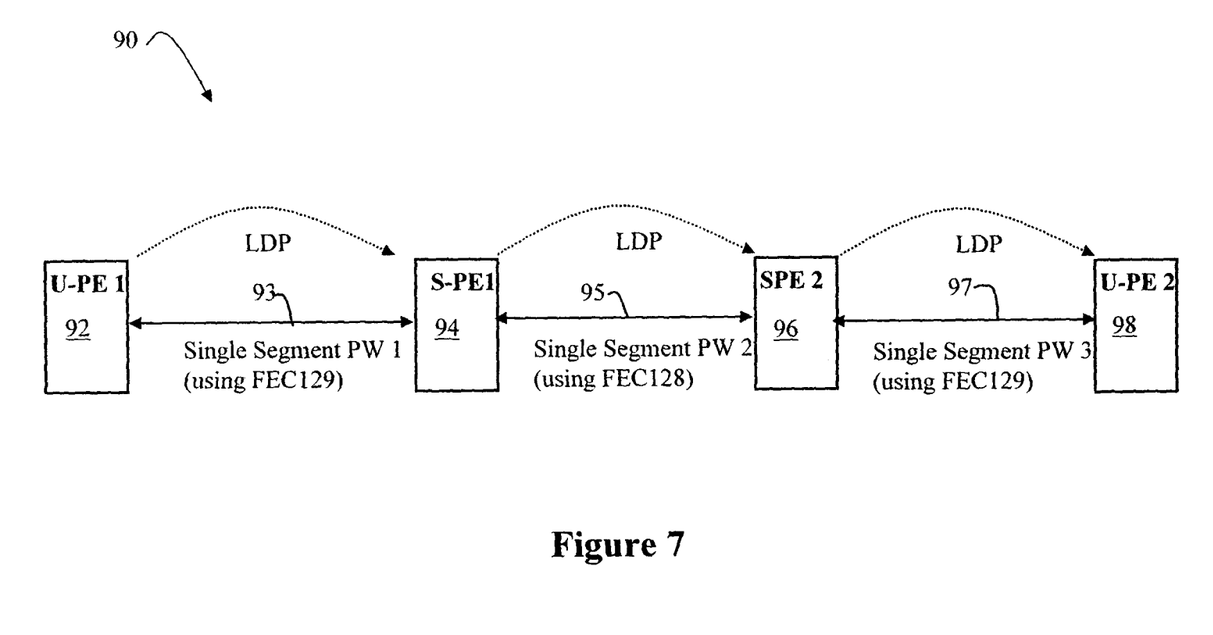

In the particular embodiments described in FIGS. 5-7, the MS-PW TLV of the present invention overcomes the problem bridging the existing protocols by advantageously including, in the LDP message, a MS-PW TLV that includes pseudowire attachment information. A description of how the MS-PW TLV information may be used to overcome the problems posed by the existing pseudowire protocols will now be described with regards to functional flow diagrams FIGS. 5-7.

FIG. 5 illustrates three devices: Ultimate Provider Edge (U-PE) 72, Switching Provider Edge (S-PE) 74 and U-PE 76. For the purposes of this application, a device is 'upstream' to any device to which it forwards a label. A device that receives a label is 'downstream' to that device. Thus in FIG. 5, S-PE is downstream of device U-PE 72, and upstream to device U-PE 76. U-PE 72 is upstream from device S-PE 74.

To establish Multi-Segment Pseudowire 71 between U-PE 72 and U-PE 76, U-PE-72 generates a label mapping message including FEC TLV element information such as that shown in FIG. 3A. The LDP label message of the present invention includes an appended MS-PW TLV, including attachment information illustrated in FIG. 4 (or some variation thereof). When the source U-PE implements FEC 128 signaling, the MS-TLV fields are populated as follows: The SAII=PWID (which is for the source U-PE is the PWID for the MS PW), the TAII=the target identifier of the target U-PE (U-PE 76), and the AGI is the group of the target PE (U-PE 76).

S-PE 74 is both FEC 128 and FEC 129 capable. It receives the FEC 128 LDP packet from device 72, and establishes a FEC 129 pseudowire with U-PE 76 using an FEC 129 LDP label mapping message of the present invention which is augmented to include the MS-PW TLV. The MS-PW TLV forwarded by U-PE 72 is extracted from the FEC 128 LDP message and appended to the FEC 129 LDP message.

The U-PE 76 receives the LDP message, and generates a reverse label mapping to the Source U-PE 72. The reverse label mapping message includes the MS-PW TLV of the present invention, populated as follows: The SAII equals the TAII of the received label mapping (i.e., U-PE 72), the AGI is the AGI of the target U-PE, and TAII=SAII of the received label mapping (which, in this example is the PWID of the MS-PW).

With such an arrangement, an FEC 129 device, such as U-PE 76, obtains PWID information, thereby allowing successful instantiation of a MS-PW with an FEC 128 device.

FIG. 6 illustrates a network 80 provided to illustrate the use of the present invention to support MS PW which extends from an FEC 128 domain, through a FEC 129 domain and back into a different FEC 128 domain. U-PE 82 forwards a LDP labeling message of the present invention to S-PE 84. As in FIG. 5, the labeling message includes the MS PW TLV information of the present invention, which is populated with the SAII=PWID, the TAII=target U-PE (U-PE 88), and the AGI of U-PE 88.

S-PE establishes a pseudowire connection with S-PE 86, using FEC 129 protocol, passing the MS-PW TLV received from U-PE 82 onto S-PE 86. S-PE 86 extracts the information from the MS-PW TLV to populate an FEC 128 labeling message to U-PE 88.

FIG. 7 illustrates how the MS-PW TLV of the present invention may be used to establish a MS-PW in a network with a FEC 128 domain sandwiched by two FEC 129 domains. The U-PE 92 generates a FEC 129 SS pseudowire message as in the prior art. The SAII, TAII and AGI in the MS-PW TLV are populated using the corresponding fields of the FEC 129 element. S-PE 94 establishes an FEC 128 SS pseudowire with S-PE 96 using FEC 128 protocol, and passing the MS-PW TLV information unchanged to the S-PE 96. The S-PE 96 uses the MS-PW TLV information to establish the FEC 129 SS pseudowire to U-PE 98, while also performing a reverse mapping back to S-PE 94 using the FEC 128 information.

Figure 8:
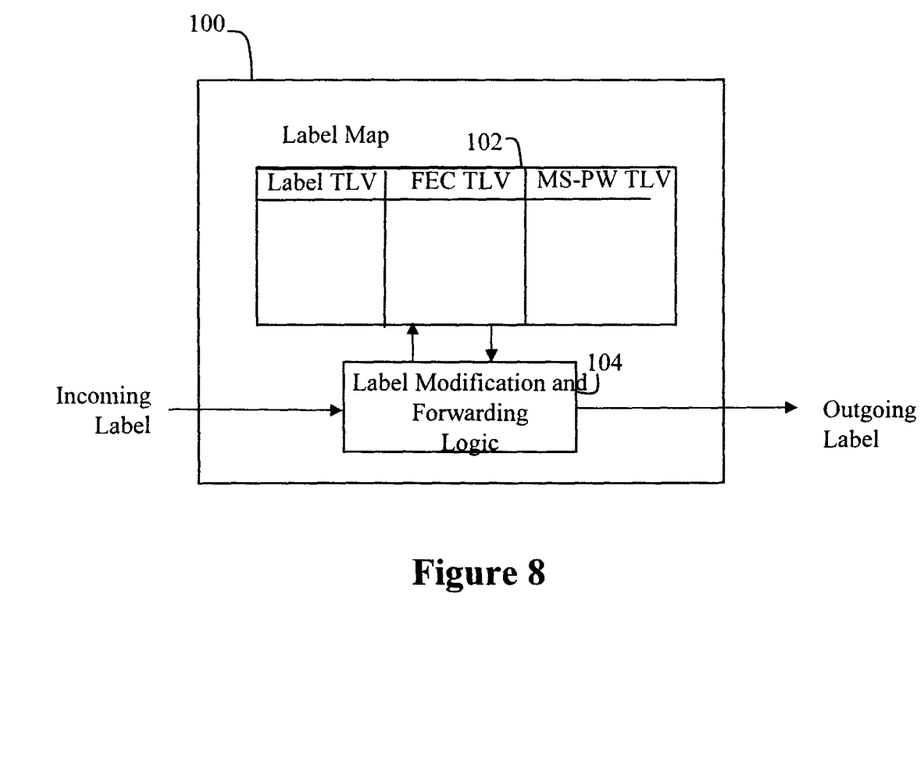
FIG. 8 is a block diagram illustrating several components that may be included in an edge device implementing the present invention.

FIG. 8 illustrates several exemplary components that may be included at an edge device 100 implementing the present invention. The components may be implemented in hardware, software or a combination thereof. The embodiment of FIG. 8 is exemplary only; it is realized that similar functions that are differently delineated are also within the scope of the present invention.

Device 100 is shown to include a label map 102 and label modification and forwarding logic 104. As labels are received at the device 100, the label modification and forwarding logic 104 analyzes the FEC TLV to determine the signaling protocol of the pseudowire. As labels are generated for downstream domains, the MS-PW element may be adapted by the label modification and forwarding logic 104 based on the pseudowire signaling domains at either end of the MS-PW that traverses the device 100. The adaptation will vary depending upon the protocols of the domains that are bridged, as discussed in FIGS. 5-7.

Accordingly a suggested architecture and use of a Multi-Segment Pseudowire TLV has been shown and described. The MS-PW TLV generally includes information that assists in bridging the signaling information gap between pseudowire PSN domains.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer input/output (I/O) attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of establishing a multi-segment pseudowire (MS-PW) across two domains, the two domains being coupled by an edge device, the method including the step of:
    forwarding a label mapping message to a first edge device coupled to a first domain of the two domains using a first pseudowire signaling protocol, the label mapping message including an MS-PW element including fields associated with a second pseudowire signaling protocol.

2. The method according to claim 1, wherein the first domain of the two domains establishes pseudowires using the first pseudowire signaling protocol, and wherein a second domain of the two domains establishes pseudowires using the second pseudowire signaling protocol.

3. The method according to claim 2, wherein the second domain is coupled by a second edge device, further comprising a third domain coupled to the second edge device, wherein at least one of the first domain, the second domain and the third domain uses a pseudowire signaling protocol that is different from at least one of the first domain and the second domain.

4. The method according to claim 1, wherein at least one of the first pseudowire signaling protocol and the second pseudowire signaling protocol is a Label distribution Protocol.

5. The method according to claim 4, wherein the label mapping message includes a Forwarding Equivalency Class (FEC) pseudowire identifier (PWid) element, and wherein a MS-PW Type-Length-Value (TLV) element includes at least one of FEC Generalized PWid information, Layer 2 Tunneling Protocol (L2TP) information and Resource Reservation Protocol-Traffic Engineering (RSVP-TE) information.

6. The method according to claim 5, wherein the label mapping message includes a Forwarding Equivalency Class (FEC) Generalized pseudowire ID (PWid) element, and wherein the MS-PW TLV element includes at least one of FEC PWid element information, the Layer 2 Tunneling Protocol (L2TP) information and the Resource Reservation Protocol-Traffic Engineering (RSVP-TE) information.

7. The method according to claim 4, wherein the label mapping message includes a Forwarding Equivalency Class (FEC) pseudowire identifier (PWid) element, and wherein a Source Attachment Individual Identifier (SAII) of a MS-PW Type-Length-Value (TLV) element is equal to a PWID value of the FEC PWid element.

8. The method according to claim 1 wherein the MS-PW element includes Attachment Information.

9. The method according to claim 8 wherein the Attachment Information includes at least one of an Attachment Group Identifier, a Source Attachment Individual Identifier and a Target Attachment Individual Identifier (TAII).

10. The method according to claim 9, wherein the first domain of the two domains uses a Forwarding Equivalency Class (FEC) pseudowire identifier (PWid) signaling protocol, and wherein the TAII of the MS-PW element is equal to a PWID field in the FEC PWid.

11. The method according to claim 1 wherein the MS-PW element includes pseudowire signaling protocol information from a third domain.

12. A method of establishing a multi-segment pseudowire includes the steps of:
    receiving an upstream label message from an upstream edge device using a first pseudowire signaling protocol, the upstream label message including a Forwarding Equivalency Class (FEC) element including information associated with the first pseudowire signaling protocol and a multi-segment pseudowire (MS-PW) element including information associated with a second pseudowire signaling protocol;
    determining that a downstream edge device uses the second pseudowire signaling protocol; and
    modifying the upstream label message to provide a downstream label message, including the step of extracting information from the MS-PW element to include in a downstream FEC element of the downstream label message; and
    forwarding the downstream label message to the downstream edge device.

13. An edge device comprising:
    a label map for associating labels with pseudowires;
    label modification logic, coupled to the label map, for generating a label mapping message including a Forwarding Equivalency Class (FEC) element for storing information related to a first pseudowire signaling protocol and a multi-segment pseudowire (MS-PW) element for storing information related to a second pseudowire signaling protocol; and forwarding logic for forwarding the label mapping message to a domain-coupled edge device.

14. The edge device of claim 13 disposed between a first domain and a second domain of a packet switched network (PSN), wherein the first domain establishes pseudowires using the first pseudowire signaling protocol, and wherein the second domain establishes pseudowires using the second pseudowire signaling protocol.

15. The edge device according to claim 14 wherein the MS-PW element includes pseudowire signaling protocol information from a third domain.

16. The edge device of claim 13, wherein at least one of the first pseudowire signaling protocol and the second pseudowire signaling protocol is a Label distribution Protocol.

17. The edge device according to claim 16, wherein the label mapping message includes a Forwarding Equivalency Class (FEC) pseudowire ID (PWid) element, and wherein a MS-PW Type-Length-Value (TLV) element includes at least one of FEC Generalized PWid information, Layer 2 Tunneling Protocol (L2TP) information and Resource Reservation Protocol-Traffic Engineering (RSVP-TE) information.

18. The edge device according to claim 17, wherein the label mapping message includes a Forwarding Equivalency Class (FEC) Generalized pseudowire ID (PWid) element, and wherein the MS-PW TLV element includes at least one of FEC PWid element information, Layer 2 Tunneling Protocol (L2TP) information and Resource Reservation Protocol-Traffic Engineering (RSVP-TE) information.

19. The edge device according to claim 13 wherein the MS-PW element includes Attachment Information.

20. The edge device according to claim 19 wherein the Attachment Information includes at least one of an Attachment Group Identifier, a Source Attachment Individual Identifier and a Target Attachment Individual Identifier (TAII).

21. The edge device according to claim 20, wherein a first domain uses an FEC pseudowire identifier (PWid) signaling protocol, and wherein the TAII of the MS-PW element is equal to a PWID field in the FEC PWid.

22. The edge device according to claim 13, wherein the label mapping message includes a Forwarding Equivalency Class (FEC) pseudowire ID (PWid) element, and wherein a Source Attachment Individual Identifier (SAII) of a MS-PW Type-Length-Value (TLV) element is equal to a PWID value of the FEC PWid element.

23. The edge device according to claim 13, wherein the label modification logic includes:
   receiving logic, for receiving an upstream label mapping message from an upstream edge device;
   logic for determining that a downstream edge device uses the second pseudowire signaling protocol; and
   logic for extracting information from a multi-segment pseudowire (MS-PW) element to generate a downstream label mapping message for the downstream edge device in the second pseudowire signaling protocol.

24. A non-transitory computer readable medium storing a label map for associating labels with pseudowires and instructions comprising:
   a step for generating a label message comprising a label Type-Length-Value (TLV), a Forwarding Equivalency Class (FEC) TLV element for storing information related to a first pseudowire signaling protocol and a multi-segment pseudowire (MS-PW) TLV element for storing information related to a second pseudowire signaling protocol; and
   a step for forwarding the label message to a domain-coupled edge device.

* * * * *